US011691912B2

(12) United States Patent
Tatebe et al.

(10) Patent No.: US 11,691,912 B2
(45) Date of Patent: Jul. 4, 2023

(54) CHEMICALLY STRENGTHENED AND TEXTURED GLASS HOUSING MEMBER

(71) Applicant: Apple Inc., Cupertino, CA (US)

(72) Inventors: Masashige Tatebe, Kakogawa (JP); Takahiro Oshima, Nerima-ku (JP); Jody Akana, San Francisco, CA (US); Palaniappan Chinnakaruppan, Cupertino, CA (US); Tushar S. Deshpande, San Jose, CA (US); Kenichi Nakajima, Fujisawa (JP); Shigehiro Sanichi, Osaka (JP); Takashi Kato, Osaka (JP); Koji Takano, Osaka (JP)

(73) Assignee: APPLE INC., Cupertino, CA (US)

(*) Notice: Subject to any disclaimer, the term of this patent is extended or adjusted under 35 U.S.C. 154(b) by 307 days.

(21) Appl. No.: 16/659,173

(22) Filed: Oct. 21, 2019

(65) Prior Publication Data

US 2020/0189973 A1 Jun. 18, 2020

Related U.S. Application Data

(60) Provisional application No. 62/781,542, filed on Dec. 18, 2018.

(51) Int. Cl.
*B32B 15/04* (2006.01)
*B32B 17/06* (2006.01)
(Continued)

(52) U.S. Cl.
CPC ............ *C03C 21/002* (2013.01); *C03C 3/083* (2013.01); *C03C 17/007* (2013.01); *C03C 17/04* (2013.01);
(Continued)

(58) Field of Classification Search
CPC .................................................. C03C 21/002
(Continued)

(56) References Cited

U.S. PATENT DOCUMENTS 4,633,323 A 12/1986 Haberkern et al.
5,476,821 A * 12/1995 Beall .................. G11B 5/73921
428/846.9
(Continued)

FOREIGN PATENT DOCUMENTS

CN 101712102 5/2010
CN 203013800 6/2013
(Continued)

OTHER PUBLICATIONS

U.S. Appl. No. 16/242,905, filed Jan. 8, 2019, pending.
(Continued)

*Primary Examiner* — Lauren R Colgan
(74) *Attorney, Agent, or Firm* — Brownstein Hyatt Farber Schreck, LLP

(57) ABSTRACT

A glass member for a housing of an electronic device may include an aluminosilicate glass substrate defining a first surface of the glass member, the first surface having a first surface roughness, a fused composite coating bonded to a portion of the aluminosilicate glass substrate and defining a second surface of the glass member, the second surface having a second surface roughness greater than the first surface roughness, a first ion-exchanged layer extending into the glass member and through the fused composite coating, and a second ion-exchanged layer extending into the glass member from the first surface. The fused composite coating may include an amorphous glass matrix and a crystalline material dispersed in the amorphous glass matrix.

20 Claims, 9 Drawing Sheets

(51) Int. Cl.
    *C03C 21/00*     (2006.01)
    *C03C 17/04*     (2006.01)
    *C03C 3/083*     (2006.01)
    *H01M 50/124*     (2021.01)
    *C03C 17/00*     (2006.01)

(52) U.S. Cl.
    CPC ..... *H01M 50/124* (2021.01); *H01M 50/1245* (2021.01); *C03C 2203/52* (2013.01); *C03C 2217/77* (2013.01)

(58) Field of Classification Search
    USPC .......................................................... 428/410
    See application file for complete search history.

(56) References Cited

U.S. PATENT DOCUMENTS

| | | | |
|---|---|---|---|
| 6,068,891 A | 5/2000 | O'Dell et al. | |
| 6,677,703 B2 | 1/2004 | Ito et al. | |
| 7,297,386 B2 | 11/2007 | Suzuki et al. | |
| 7,646,143 B2 | 1/2010 | Kimura et al. | |
| 8,092,911 B2 | 1/2012 | Sakoske et al. | |
| 8,106,787 B2 | 1/2012 | Nurmi | |
| 8,184,373 B2 | 5/2012 | Tanaka et al. | |
| 8,213,085 B2 | 7/2012 | Liu et al. | |
| 8,553,333 B2 | 10/2013 | Chang et al. | |
| 8,576,561 B2 | 11/2013 | Myers et al. | |
| 8,603,372 B2 | 12/2013 | Tanaka et al. | |
| 8,681,113 B1 | 3/2014 | Wu et al. | |
| 8,771,532 B2 | 7/2014 | Carlson et al. | |
| 8,872,295 B2 | 10/2014 | Hermans et al. | |
| 8,896,802 B2 | 11/2014 | Yoneyama et al. | |
| 8,953,083 B2 | 2/2015 | Hedge | |
| 9,017,566 B2 | 4/2015 | Lander et al. | |
| 9,034,166 B2 | 5/2015 | Tatebe et al. | |
| 9,154,678 B2 | 10/2015 | Kwong et al. | |
| 9,239,594 B2 | 1/2016 | Lee et al. | |
| 9,240,498 B2 | 1/2016 | Fujita et al. | |
| 9,262,002 B2 | 2/2016 | Momeyer et al. | |
| 9,377,603 B1 | 6/2016 | Cheng et al. | |
| 9,448,713 B2 | 9/2016 | Cruz-Hernandez et al. | |
| 9,554,482 B2 | 1/2017 | Wilson et al. | |
| 9,644,281 B2 | 5/2017 | Tatebe et al. | |
| 9,658,500 B2 | 5/2017 | Iwamoto | |
| 9,720,141 B1 | 8/2017 | Cheng et al. | |
| 9,732,237 B2 | 8/2017 | Sugamoto et al. | |
| 9,745,221 B2 | 8/2017 | Ehrensperger et al. | |
| 9,862,124 B2 | 1/2018 | Radcliffe et al. | |
| 9,880,327 B2 | 1/2018 | Park et al. | |
| 9,938,186 B2 | 4/2018 | Moll et al. | |
| 9,961,337 B2 | 5/2018 | Stroetmann | |
| 10,013,020 B2 | 7/2018 | Hong et al. | |
| 10,043,052 B2 | 8/2018 | Wickboldt et al. | |
| 10,101,583 B2 | 10/2018 | Saenger Nayver et al. | |
| 10,171,636 B2 | 1/2019 | Yeo et al. | |
| 10,214,445 B2 | 2/2019 | Hart et al. | |
| 10,298,824 B2 | 5/2019 | Lee et al. | |
| 10,442,151 B2 | 10/2019 | Ozeki et al. | |
| 10,647,032 B2 | 5/2020 | Radcliffe et al. | |
| 10,676,393 B2 | 6/2020 | Weber et al. | |
| 10,690,818 B2 | 6/2020 | Chen et al. | |
| 10,781,135 B2 | 9/2020 | Weber et al. | |
| 10,827,635 B1 | 11/2020 | Limarga et al. | |
| 10,843,439 B2* | 11/2020 | Gulati .................... | C03C 21/00 |
| 10,866,616 B2 | 12/2020 | Seo et al. | |
| 10,948,633 B2 | 3/2021 | Murakami et al. | |
| 2002/0127565 A1 | 9/2002 | Cunningham | |
| 2003/0011315 A1 | 1/2003 | Ito et al. | |
| 2005/0266250 A1 | 12/2005 | Hayakawa | |
| 2006/0024508 A1 | 2/2006 | D'Urso et al. | |
| 2006/0034042 A1 | 2/2006 | Hisano et al. | |
| 2007/0195419 A1 | 8/2007 | Tsuda et al. | |
| 2009/0257207 A1 | 10/2009 | Wang et al. | |
| 2012/0127755 A1 | 5/2012 | Shiau et al. | |
| 2012/0194974 A1 | 8/2012 | Weber et al. | |
| 2012/0218640 A1 | 8/2012 | Gollier et al. | |
| 2012/0274565 A1 | 11/2012 | Moser et al. | |
| 2013/0026593 A1 | 1/2013 | Hermans et al. | |
| 2013/0235462 A1 | 9/2013 | Haas | |
| 2013/0273324 A1 | 10/2013 | Moll et al. | |
| 2013/0296155 A1* | 11/2013 | Beall .................... | C03C 10/0027 501/32 |
| 2014/0035869 A1 | 2/2014 | Yun et al. | |
| 2014/0063609 A1 | 3/2014 | Iwata et al. | |
| 2014/0098075 A1 | 4/2014 | Kwak et al. | |
| 2014/0106127 A1 | 4/2014 | Lyons et al. | |
| 2014/0327643 A1 | 11/2014 | Sun et al. | |
| 2015/0090689 A1 | 4/2015 | Guilfoyle et al. | |
| 2016/0154435 A1 | 6/2016 | Yanagisawa et al. | |
| 2016/0167343 A1* | 6/2016 | Gulati .................... | C03B 27/0413 428/218 |
| 2016/0188181 A1 | 6/2016 | Smith et al. | |
| 2016/0224822 A1 | 8/2016 | Hasegawa et al. | |
| 2016/0283014 A1 | 9/2016 | Rider et al. | |
| 2016/0306390 A1 | 10/2016 | Vertegaal et al. | |
| 2017/0026553 A1 | 1/2017 | Lee et al. | |
| 2017/0058130 A1 | 3/2017 | Addleman et al. | |
| 2017/0276618 A1 | 9/2017 | Takagi | |
| 2017/0308234 A1 | 10/2017 | Li et al. | |
| 2018/0042131 A1 | 2/2018 | Liu et al. | |
| 2018/0086662 A1 | 3/2018 | Luzzato et al. | |
| 2018/0162091 A1 | 6/2018 | Takeda et al. | |
| 2018/0162768 A1* | 6/2018 | Boek .................... | C03B 17/064 |
| 2018/0215657 A1 | 8/2018 | Jin et al. | |
| 2018/0282201 A1 | 10/2018 | Hancock et al. | |
| 2019/0032237 A1 | 1/2019 | Kim et al. | |
| 2019/0037690 A1 | 1/2019 | Wilson et al. | |
| 2019/0155339 A1 | 5/2019 | Fenton et al. | |
| 2019/0230204 A1 | 7/2019 | Zhang | |
| 2019/0236887 A1 | 8/2019 | Rich et al. | |
| 2019/0241455 A1 | 8/2019 | Sweney et al. | |
| 2019/0246018 A1 | 8/2019 | Rho et al. | |
| 2019/0256410 A1 | 8/2019 | Isshiki et al. | |
| 2019/0331940 A1 | 10/2019 | Poole et al. | |
| 2020/0014780 A1 | 1/2020 | Jones | |
| 2020/0026327 A1 | 1/2020 | Hendren et al. | |
| 2020/0189966 A1 | 6/2020 | Lee et al. | |
| 2020/0199020 A1 | 6/2020 | Hatano et al. | |
| 2020/0301527 A1 | 9/2020 | Poole et al. | |
| 2020/0304616 A1 | 9/2020 | Jones | |
| 2020/0379143 A1 | 12/2020 | Gu et al. | |
| 2020/0389991 A1 | 12/2020 | Shannon et al. | |
| 2021/0014992 A1 | 1/2021 | Limarga et al. | |
| 2021/0378117 A1 | 12/2021 | Shannon et al. | |
| 2021/0397220 A1 | 12/2021 | Hendren et al. | |
| 2022/0071039 A1 | 3/2022 | Limarga et al. | |

FOREIGN PATENT DOCUMENTS

| | | |
|---|---|---|
| CN | 103502166 | 1/2014 |
| CN | 203406929 | 1/2014 |
| CN | 104024929 | 9/2014 |
| CN | 104583147 | 4/2015 |
| CN | 105283322 | 1/2016 |
| CN | 107438494 | 12/2017 |
| CN | 207070526 | 3/2018 |
| CN | 107911964 | 4/2018 |
| CN | 107924002 | 4/2018 |
| CN | 10832510 | 10/2018 |
| CN | 207992872 | 10/2018 |
| CN | 109202296 | 1/2019 |
| CN | 208433428 | 1/2019 |
| CN | 208461858 | 2/2019 |
| CN | 109547679 | 3/2019 |
| CN | 109640557 | 4/2019 |
| CN | 107683055 | 9/2022 |
| DE | 10223165 | 12/2003 |
| EP | 3454541 | 3/2019 |
| JP | 2011510904 | 4/2011 |
| JP | 2013242725 | 12/2013 |
| JP | 2016045824 | 4/2016 |
| JP | 2017508178 | 3/2017 |
| JP | 2018506851 | 3/2018 |
| KR | 20130127842 | 11/2013 |

(56) References Cited

FOREIGN PATENT DOCUMENTS

| | | |
|---|---|---|
| KR | 20160145081 | 12/2016 |
| KR | 20170076779 | 7/2017 |
| KR | 20180018782 | 2/2018 |
| TW | 201910882 | 3/2019 |
| WO | WO2014/011328 | 1/2014 |
| WO | WO2014/012003 | 1/2014 |
| WO | WO2015/191949 | 12/2015 |
| WO | WO2016/088983 | 6/2016 |
| WO | WO2016196615 * | 12/2016 |
| WO | WO2017/038868 | 3/2017 |
| WO | WO2019/027675 | 2/2019 |

OTHER PUBLICATIONS

U.S. Appl. No. 16/268,338, filed Feb. 5, 2019, pending.
U.S. Appl. No. 16/401,004, filed May 1, 2019, pending.
U.S. Appl. No. 16/425,741, filed May 29, 2019, pending.
U.S. Appl. No. 16/506,887, filed Jul. 9, 2019, pending.
U.S. Appl. No. 16/564,244, filed Sep. 9, 2019, pending.
U.S. Appl. No. 16/564,325, filed Sep. 9, 2019, pending.
U.S. Appl. No. 16/564,568, filed Sep. 9, 2019, pending.
Author Unknown, "LG's Future Display Technology Will Blow You Away," Techno Source, https://www.youtube.com/watch?v=qlRjytgNuhM, 2 pages, May 2, 2017.
Seth, Radhika, "A Fresh New Look at the Computer," https://www.yankodesign.com/2009/02/06/a-fresh-new-look-at-the-computer, 1 page, Feb. 6, 2009.
Wimmer, "Curve: Revisiting the Digital Desk," NordiCHI '10: Proceedings of the 6th Nordic Conference on Human-Computer Interaction: Extending Boundaries, https://doi.org/10.1145/1868914.1868977, http://www.mmi.ifi.lmu.de/pubdb/publications/pub/wimmer2010Curve/wimmer2010Curve.pdf, https://dl.acm.org/doi/10.1145/1868914.1868977, pp. 561-570, Oct. 2010.
Ben-Yakar et al., "Femtosecond laser ablation properties of borosilicate glass," Journal of Applied Physics, vol. 96, No. 9, 8 pages, Nov. 1, 2004.
Hedayati et al., Antireflective Coatings: Conventional Stacking Layers and Ultrathin Plasmonic Metasurfaces, A Mini-Review, Materials, vol. 9, No. 497, 2016.
Qi et al., "Simple Approach to Wafer-Scale Self-Cleaning Antireflective Silicon Surfaces," American Chemical Society, State Key Laboratory of Supramolecular Structure and Materials, College of Chemistry, Jilin University, Changchun 130012, P.R. China, 2009.
Tan et al., "Broadband antireflection film with moth-eye-like structure for flexible display applications," Optica, vol. 4, No. 7, pp. 678-683, Jul. 2017.

* cited by examiner

CHEMICALLY STRENGTHENED AND TEXTURED GLASS HOUSING MEMBER

This application is a nonprovisional patent application of and claims the benefit of 62/781,542, filed Dec. 18, 2018 and titled "Chemically Strengthened and Textured Glass Housing Member," the disclosure of which is hereby incorporated herein by reference in its entirety.

FIELD

The described embodiments relate generally to chemically strengthened glass members with textured surfaces.

BACKGROUND

Electronic devices may use glass for various components and applications. For example, handheld and wearable electronic devices, such as tablet computers, mobile phones (e.g., smartphones), and electronic watches, may use glass housing components. Glass housing components for electronic devices may provide advantages such as transparency, scratch resistance, hardness, stiffness, and the like. Glass housing components may be processed to impart various characteristics or properties to the glass. For example, glass may be chemically strengthened or tempered to improve its strength and/or toughness.

SUMMARY

A glass member for a housing of an electronic device may include an aluminosilicate glass substrate defining a first surface of the glass member, the first surface having a first surface roughness, a fused composite coating bonded to a portion of the aluminosilicate glass substrate and defining a second surface of the glass member, the second surface having a second surface roughness greater than the first surface roughness, a first ion-exchanged layer extending into the glass member and through the fused composite coating, and a second ion-exchanged layer extending into the glass member from the first surface. The fused composite coating may include an amorphous glass matrix and a crystalline material dispersed in the amorphous glass matrix. The crystalline material may define a tactile texture along the second surface. The second ion-exchanged layer may extend into the aluminosilicate glass substrate. The first surface roughness may have an average surface roughness (Ra) between about 0.1 microns and about 3 microns.

The first ion-exchanged layer may include sodium ions, from the fused composite coating, in the aluminosilicate glass substrate, and lithium ions, from the aluminosilicate glass substrate, in the fused composite coating. The first ion-exchanged layer may have a first composition and may include sodium ions, lithium ions, and potassium ions. The second ion-exchanged layer may have a second composition different from the first composition and may include lithium ions and potassium ions. The first ion-exchanged layer may extend a first depth into the glass member, and the second ion-exchanged layer may extend a second depth into the glass member, the second depth different than the first depth.

An electronic device may include a processor, a display, and a housing comprising a chemically strengthened glass member. The chemically strengthened glass member may include an aluminosilicate glass substrate defining a first surface of the chemically strengthened glass member and a fused composite coating bonded to the aluminosilicate glass substrate and defining a second surface of the chemically strengthened glass member, the second surface having a surface roughness greater than a surface roughness of the first surface.

The housing may further define a glass member defining a front of the electronic device and positioned over the display, and the chemically strengthened glass member may define a back of the electronic device. The second surface of the chemically strengthened glass member may define an exterior back surface of the electronic device.

The fused composite coating may include an amorphous glass matrix and a crystalline material dispersed in the amorphous glass matrix. The chemically strengthened glass member may include a first ion-exchanged layer extending into the chemically strengthened glass member from the first surface and having a first compressive stress profile, a second ion-exchanged layer extending into the chemically strengthened glass member from the second surface and having a second compressive stress profile different than the first compressive stress profile, and a region between the first and second ion-exchanged layers and having a tensile stress profile.

The aluminosilicate glass substrate may have a first coefficient of thermal expansion, and the fused composite coating may have a second coefficient of thermal expansion that is the same as the first coefficient of thermal expansion. The fused composite coating may have a thickness between about 2 microns and about 20 microns.

A method may include applying, to a surface of an aluminosilicate glass substrate, a composite coating comprising a glass frit, a crystalline material, and a solvent. The method may further include drying the composite coating to remove the solvent, heating the aluminosilicate glass substrate and the composite coating to bond the composite coating to the aluminosilicate glass substrate and define a tactile surface defined at least in part by the crystalline material, thereby forming a textured glass member, and chemically strengthening the textured glass member. The operation of heating the aluminosilicate glass substrate and the composite coating may cause sodium ions to migrate from the composite coating into the aluminosilicate glass substrate. The method may further include coupling the textured glass member to a housing member of a mobile phone such that the composite coating defines an exterior surface of the mobile phone.

The operation of heating the aluminosilicate glass substrate and the composite coating may include heating the aluminosilicate glass substrate and the composite coating to a temperature above a softening temperature of the glass frit, below a softening temperature of the aluminosilicate glass substrate, and below a melting temperature of the crystalline material. The operation of chemically strengthening the textured glass member may include submerging the textured glass member in a bath comprising potassium salt. The operation of applying the composite coating may include screen printing the composite coating on one side of the aluminosilicate glass substrate.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
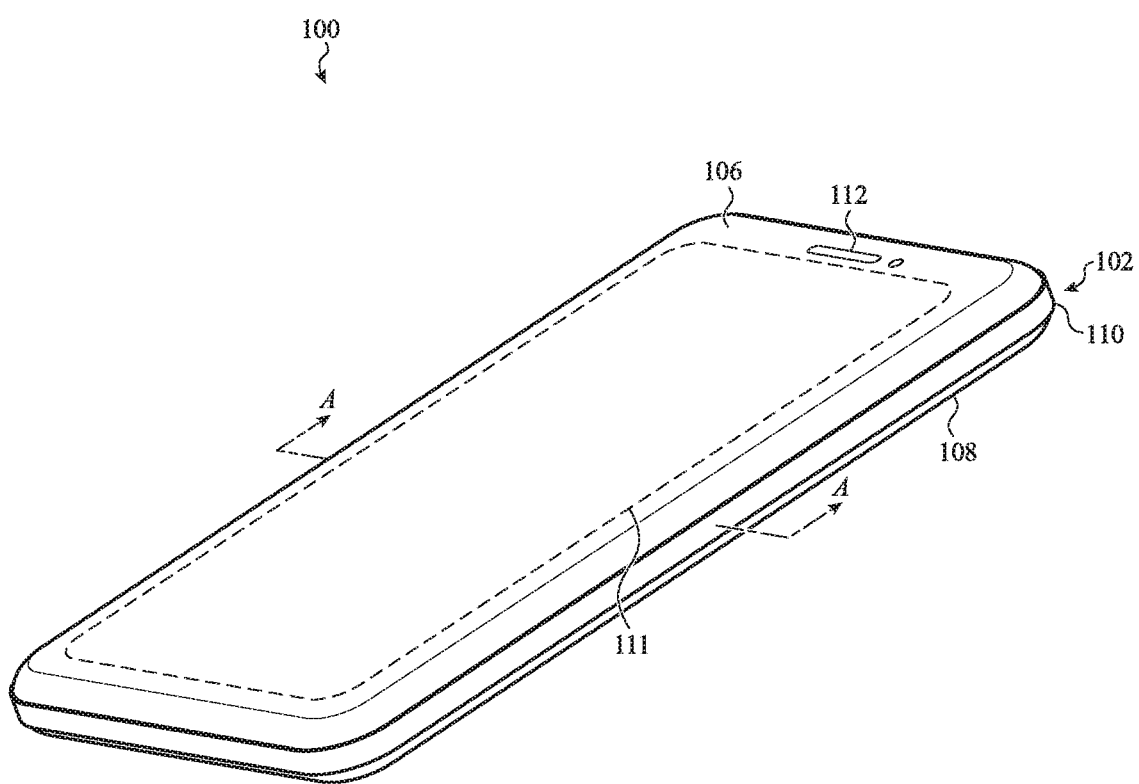
FIG. 1A depicts a front perspective view of an example electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to textured glass members for electronic devices, and more particularly, to glass housing members with textured surfaces that produce a particular tactile feel and appearance to the glass housing member. The textured surfaces may improve the functionality of an electronic device in various ways. For example, in the context of a smartphone, the textured surface may have a higher coefficient of friction than an untextured glass surface, allowing the phone to be more easily held in a user's hand and preventing the phone from slipping or sliding off of tables or other resting surfaces. As another example, fingerprints may be less visible on a textured surface as compared to a smooth, untextured glass surface. Other aesthetic results may also be achieved by the textured glass surfaces.

Textured glass members described herein may be formed by applying and bonding a composite coating to a glass substrate. The composite coating may include glass frit (e.g., glass powder or particulate), and optionally additional materials such as powders of crystalline materials. When heated, the composite coating, or components thereof, may soften and fuse together, and also bond to the underlying glass substrate. The resulting fused composite coating may have a particular surface roughness (Ra) that imparts a desired tactile feel to the glass member and ultimately to the electronic device housing in which it is incorporated. (The fused composite coating may have a particular translucency or other optical or visual property.) The surface roughness may be a result of incomplete melting and/or flowing of an amorphous glass frit material in the coating (e.g., the powder may not flatten completely along the exposed surface). Alternatively or additionally, other particulates in the coating may not soften, or may soften to a lesser degree than an amorphous glass frit, when the coating is fused, and thus may impart a surface texture to the exposed surface of the glass member. For example, particles or powder of a crystalline material may be mixed with an amorphous glass frit. When fused, the amorphous glass frit may fuse together to form a matrix that holds the particles or powder of the crystalline material.

After the composite coating is fused together and bonded to the substrate, the resulting textured glass member may be chemically strengthened to improve the strength, toughness, and/or other structural material property of the textured glass member. Chemical strengthening may include submerging the textured glass member in an ion-exchange bath, or any other suitable chemical strengthening process.

A textured glass member having particular characteristics, such as a particular surface roughness, may be achieved by selecting particular materials for the substrate and the composite coating, as well as by selecting particular processing steps and processing parameters. For example, in some cases, a target surface roughness may be specified for a textured glass member, and that surface roughness may be achieved by selecting a composite coating with particular properties, such as particle size and/or composition, as well as by selecting particular processing parameters, such as the time and temperature of a fusing operation. Other example properties of a textured glass member that may be controlled by adjusting the materials of the composite coating (and the processing parameters of the glass texturing process) include, without limitation, haziness, glossiness, roughness, transmissivity, transparency, translucency, and opacity.

Further, the materials for the substrate and the composite coating may also be selected so that the textured glass member does not warp or bend as a result of the chemical strengthening. For example, a textured glass surface may react to a chemical strengthening process differently than a smooth surface. Accordingly, in cases where a composite coating is applied to just one side of a glass substrate (or any other amount that is less than all sides), a chemical strengthening process may result in an asymmetrical internal force distribution within the textured glass member which may in turn result in a non-flat (e.g., curved) glass member. To mitigate this, the substrate and composite coating described herein may be selected so that the effect of a chemical strengthening process does not result in significant bending or warping. In some cases, this is achieved by selecting materials of the composite coating so that the composite coating has a same or similar coefficient of thermal expansion (CTE) as the substrate. In some cases, the CTE of the composite coating is different than that of the substrate in order to ensure symmetrical internal forces (or otherwise ensure that the resulting textured glass member is flat).

FIG. 1A shows an example electronic device 100 (also referred to herein simply as a "device"). The device 100 shown in FIG. 1A is a mobile phone (e.g., a smartphone), but this is merely one representative example of a device that may be used in conjunction with the ideas disclosed herein. Other example devices include, without limitation, music/media players, tablet computers, laptop computers, wearable electronic devices, watches (e.g., mechanical, electrical, or electromechanical), and the like.

The electronic device 100 includes a housing 102 that includes a first glass member 106 and a second glass member 108. The first glass member 106, which may be referred to as a cover member, may cover or otherwise overlie a display and/or a touch sensitive surface (e.g., a touchscreen) of the device 100, and may define an exterior front surface of the device 100. Where the first glass member 106 overlies a display (e.g., a touch-sensitive display assembly 111), it may be transparent so that graphical outputs displayed by the display are visible through the first glass member 106. The first glass member 106 may also define one or more openings, such as opening 112, to allow internal components such as microphones, cameras, speakers, sensors, and the like, to have access to the surrounding environment of the device 100. The second glass member 108 may define an exterior back surface of the device 100. The first and second glass members 106, 108 may define the entire front and back surfaces, respectively, of the electronic device.

The first and second glass members 106, 108 may be attached to a housing member 110. The housing member 110 may define at least a portion of the side surfaces of the device 100. The housing member 110 may be formed from or include metal, glass, polymer, ceramic, composite, or any other suitable material or combination of materials. The first and second glass members 106, 108 may be attached to the housing member 110 via any suitable means, including adhesives, fasteners, glass frit bonds, welds, solder joints, or the like.

Either or both of the first and second glass members 106, 108 may include a tactile surface or texture. As used herein, a tactile surface or tactile texture may refer to a surface or texture that produces a tactile feel when touched or held by a user (e.g., by a user's finger). Tactile surfaces and textures may have a particular surface roughness (e.g., a surface roughness above a threshold value) and may have a different tactile feel than a conventional smooth or polished glass surface. In some cases, a "tactile surface" or a "tactile texture" may have or correspond to an average surface roughness value between about 0.1 microns and about 10 microns, between about 0.1 microns and about 5 microns, between about 1 micron and about 10 microns, between about 5 microns and about 8 microns, or any other suitable average surface roughness.

Either or both of the first and second glass members 106, 108 may be formed from or include a single layer or multiple layers. In the latter case, the multiple layers may be multiple glass layers, combinations of glass and other materials (e.g., plastics, polymers, ceramics, sapphire, etc.), coating layers, oleophobic coatings, paints, inks, or the like.

The textured surface may extend over any amount of either glass member. For example, the exterior surfaces defined by the first and second glass members 106, 108 may be textured. In some cases, only one or the other of the first and second glass members 106, 108 has a textured surface (e.g., the second glass member 108 may have a textured surface while the first glass member 106 is polished smooth or otherwise lacks the surface texture of the second glass member 108). In some cases, both the first and second glass members 106, 108 are textured, but the textures are different (e.g., they differ in surface roughness, haziness, glossiness, roughness, transmissivity, transparency, translucency, opacity, or the like).

In some cases, a non-glass member may be used instead of either or both of the first and second glass members 106, 108. For example, either member may instead be a plastic member, ceramic member, sapphire member, metal member, or the like. Regardless of the exact materials or structures of the housing 102 of the device 100, glass members may be textured as described herein.

Figure 1B:
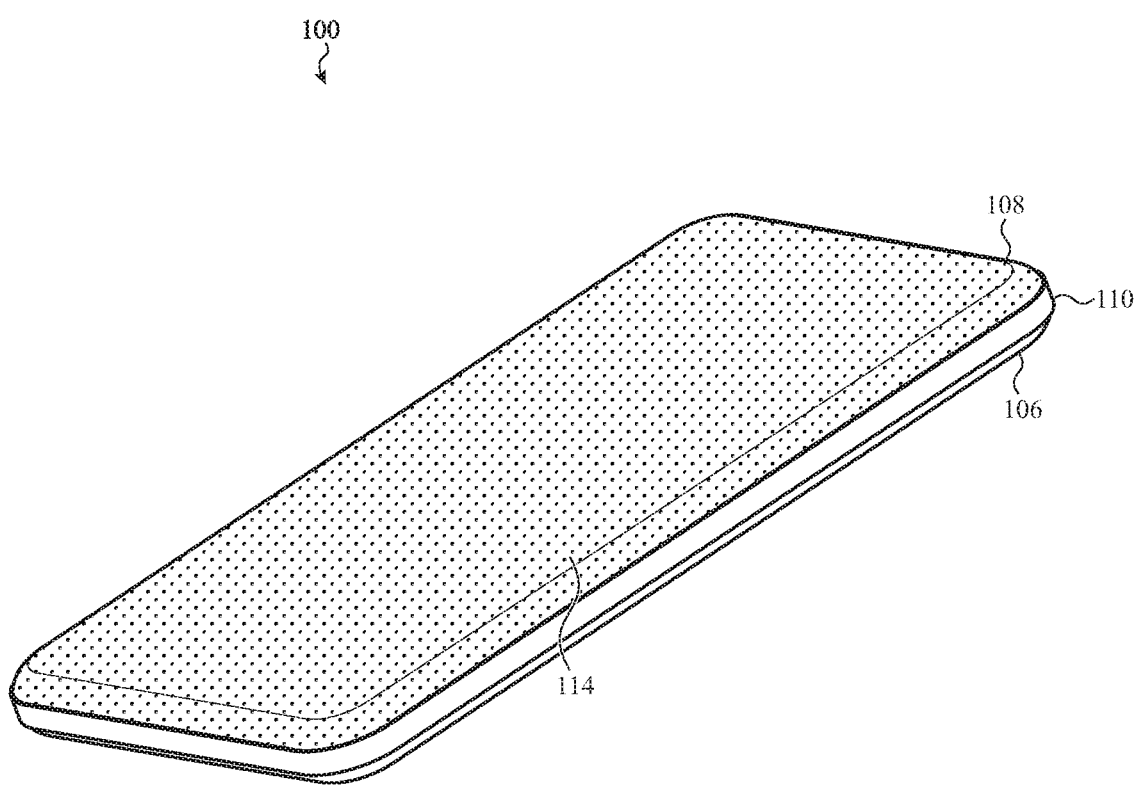
FIG. 1B depicts a rear perspective view of the electronic device of FIG. 1A.

FIG. 1B shows the back of the device 100. As noted above, the second glass member 108 may define an exterior back surface of the device 100. The second glass member may have a textured surface 114, which may be produced by bonding a composite coating to a glass substrate. The textured surface 114 may improve the functionality of the device 100 in various ways. For example, as compared to a smooth glass surface (e.g., coated or uncoated polished float glass), the textured surface 114 may produce a particular tactile texture that makes the device 100 easier or more comfortable to hold. Further, the textured surface 114 may be less likely to show fingerprints or smudges than a smooth glass surface. The textured surface 114 may be configured to have a particular surface roughness to achieve a particular tactile texture, coefficient of friction, and/or appearance. For example, the textured surface 114 may have an average surface roughness (Ra) between about 0.1 microns and about 10 microns, between about 0.1 microns and about 3 microns, between about 0.2 microns and about 0.4 microns, between about 1 micron and about 10 microns, between about 5 microns and about 8 microns, or any other suitable average surface roughness.

The textured surface 114 may also be visually obscure components under the second glass member 108. In some cases, the composite coating that forms the textured surface 114 may be mixed with or include a pigment, or ink, which may increase the opacity of and impart a color to the second glass member 108. The textured surface 114 is shown in FIG. 1B as extending over the entire exterior surface of the second glass member 108. In some cases, the textured surface 114 may cover only a portion of a surface of a glass member, as shown and described herein with respect to FIG. 6.

Either or both of the first and second glass members 106, 108 may be chemically strengthened to improve the strength, hardness, toughness, or other physical property of the glass members. For example, the first and second glass members 106, 108 may be formed from or include aluminosilicate glass substrates that have been subjected to chemical strengthening processes. Other substrate materials are also possible, including, without limitation, borosilicate glass, soda lime glass, sapphire, ceramics, polymer materials, or the like.

Figure 1C:
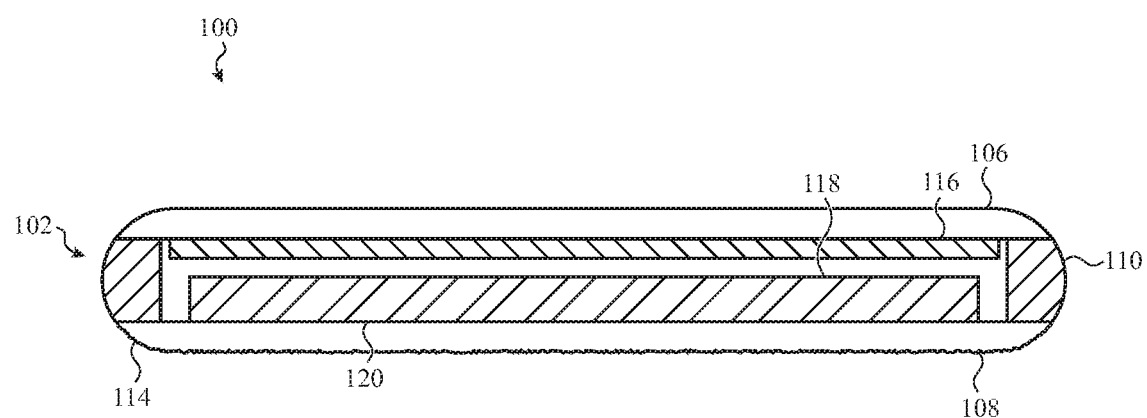
FIG. 1C depicts a partial cross-sectional view of the electronic device of FIGS. 1A-1B.

FIG. 1C depicts a partial cross-sectional view of the electronic device 100 of FIGS. 1A and 1B along line A-A in FIG. 1A. The housing member 110 and the first and second glass members 106, 108 at least partially define an interior volume for receiving electronic components. As shown, the second glass member 108 defines the textured surface 114 along the exterior back side of the device 100. In some cases, an interior surface 120 of the second glass member 108 may have a lower surface roughness than the exterior surface. For example, the interior surface 120 may lack a composite coating and as such may correspond to the bare surface of the glass substrate of the second glass member 108.

As depicted in FIG. 1C, the device 100 includes a display 116 that is at least partially positioned within the interior volume of the housing 102. In this example, the display 116 is coupled to the first glass member 106. The display 116 may include a liquid-crystal display (LCD), light-emitting diode, organic light-emitting diode (OLED) display, an active layer organic light emitting diode (AMOLED) display, organic electroluminescent (EL) display, electrophoretic ink display, or the like.

As depicted in FIG. 1C, a component 118 is positioned at least partially within the interior volume. In this example, the component 118 is coupled to the second glass member 108, though in other examples it may be secured to the housing 102 in a different manner. For example, the electronic device 100 may include one or more of a display, an input device, a sensor, memory, a processor, control circuitry, a battery, a circuit board, a frame or other supporting structure, an antenna, or the like. Additional or different components may also be positioned within housing 102. The electronic device 100 may include various systems and/or components that can receive information from or about a user or the user's surroundings (e.g., touchscreens, microphones, biometric sensors, GPS systems). It is well understood that the use of personally identifiable information (such as information from or about a user or the user's environment and that is stored on or accessible by a device) should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Figure 2A:
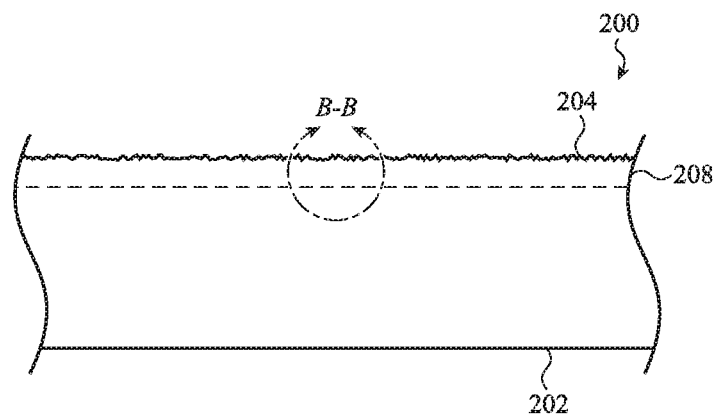
FIG. 2A depicts a partial cross-sectional view of a glass member having a textured surface.

FIG. 2A is a cross-sectional view of a glass member 200 having a textured surface. The glass member 200 may be an embodiment of the second glass member 108 of FIGS. 1A-1C, or any other glass member described herein (e.g., the first glass member 106). The glass member 200 defines a first surface 202 and a second surface 204. The second surface 204 may define a surface texture resulting from a fused composite coating being bonded to a glass substrate and producing a particular tactile texture (e.g., feel) and appearance, as described above. As such, the glass member 200 may be integrated with an electronic device such that the second surface 204 defines an exterior surface of the device.

The surface roughness of the second surface 204 may be any suitable surface roughness to produce a particular tactile texture and appearance. For example, the surface roughness of the second surface 204 may have a surface roughness (Ra) between about 0.1 microns and about 10 microns, between about 0.1 and about 3 microns, between about 0.2 microns and about 0.4 microns, between about 1 micron and about 10 microns, between about 5 microns and about 8 microns, or any other suitable average surface roughness. The second surface 204 may also have particular optical properties that are selected to produce a desired functionality and/or appearance. For example, the second surface 204 may have a particular haziness, glossiness, roughness, transmissivity, transparency, translucency, and/or opacity. These properties may affect various functions of the exterior surface. For example, a surface with a higher glossiness may have a lower coefficient of friction as compared to a surface with a lower glossiness, and as such may affect the ease of use of a device. Particular values of properties such as surface roughness, haziness, glossiness, roughness, transmissivity, transparency, translucency, and opacity may be achieved by bonding a composite coating to a glass substrate, and by selecting particular materials and particular physical characteristics of the composite coating.

The first surface 202 may define an interior-facing surface. As shown, the first surface 202 may have a surface roughness that is less than that of the second surface 204. In some cases, the surface roughness (Ra) of the first surface 202 may be below about 1 micron, below about 500 nanometers, below about 100 nanometers, or below about 10 nanometers. The first surface 202 may be polished to achieve a desired surface roughness, or the surface may be untreated after manufacturing and/or forming of the glass member 200. For example, the surface roughness of the first side 202 may correspond to the surface that is produced as a result of a float glass manufacturing process.

As noted above, the second surface 204 may be defined by a fused composite coating 208 that is fused together and bonded to a portion of a glass substrate 206. FIG. 2A illustrates a boundary between the glass substrate 206 and the fused composite coating 208 with a dashed line, though this is merely illustrative, and the manner in which the fused composite coating 208 is bonded to the glass substrate 206 may result in a boundary that is not straight, flat, or distinct. For example, the fused composite coating 208 may be bonded to the glass substrate 206 by heating glass frit on the glass substrate 206 until the frit and the glass substrate 206 fuse together.

The glass substrate 206 may be formed of any suitable type of glass or other suitable material. For example, the glass substrate 206 may be an aluminosilicate glass, such as a lithium aluminosilicate glass. Other example materials may include soda lime glass, borosilicate glass, crystal glass, or the like. The glass substrate 206 may be of any suitable thickness. For example, the glass substrate 206 may have a thickness of about 2.0 mm, 1.5 mm, 1.0 mm, 0.8 mm, 0.5 mm, or any other suitable thickness (including any thickness between about 0.5 mm and about 2.0 mm).

The fused composite coating 208 may be formed of or include any suitable materials. For example, the fused composite coating 208 may include a matrix material and a particulate material dispersed within the matrix material. As another example, the fused composite coating 208 may include a matrix material without a separate particulate material. The matrix material may be fused together and may be bonded to the underlying substrate 206 to form a single unitary textured glass member. For example, the matrix material of the fused composite coating 208 may intermingle with the material of the substrate 206 such that it bonds directly to the substrate 206 without any interstitial adhesives or bonding layers.

The fused composite coating 208 may have a thickness that is less than that of the substrate 206. For example, the fused composite coating 208 may have a thickness between about 1 micron and about 100 microns, or between about 1 micron and about 50 microns, or between about 2 microns and about 20 microns. The substrate 206 may have a thickness between about 0.2 mm and 2.0 mm, between about 0.5 mm and about 1.5 mm, between about 0.6 mm and about 1.0 mm, or any other suitable thickness.

The fused composite coating 208 may also include an ink, pigment, or other component that increases the opacity of the fused composite coating 208 and/or imparts a color to the fused composite coating 208. For example, the fused composite coating 208 may include a white pigment that produces a glass member with a white, opaque appearance. The pigment may be integrated with or form part of the matrix of the composite coating 208, or it may remain at least partially in particulate form and may contribute to the surface roughness of the glass member 200.

Figure 2B:
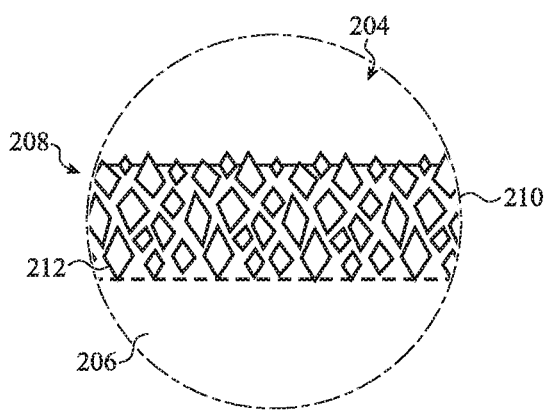
FIG. 2B depicts a detail view of a portion of the glass member of FIG. 2A according to an embodiment.

FIG. 2B illustrates a detail view of a portion of the glass member 200, corresponding to area B-B in FIG. 2A, illustrating one example composition of the fused composite coating 208. In this example, the fused composite coating 208 includes a matrix material 210 and a particulate material 212 dispersed within the matrix material 210. As shown, particles of the particulate material 212 partially protrude from the matrix material 210 to define the surface texture and/or roughness of the second surface 204 of the glass member 200. The matrix material 210 may be fused together to form a rigid and/or secure matrix that holds the particulate material 212 in place and that bonds the composite coating 208 to the glass substrate 206.

As described herein, the fused composite coating 208 may be formed by applying a composite coating that includes glass frit and the particulate material 212. The glass frit may have a melting and/or softening temperature that is below that of the substrate 206 and also below that of the particulate material 212. The composite coating 208 is then heated above the softening temperature of the glass frit and below the softening temperature of the particulate material 212 and then cooled, thereby fusing the glass frit and bonding the glass frit to the substrate 206. In this way, the glass frit forms the matrix material 210 that secures the particulate material 212 in place and allows the particulate material 212 to define the surface roughness of the second surface 204, and also bonds the fused composite coating to the substrate 206.

The matrix material 210 and the particulate material 212 may be formed from any suitable materials. For example, the matrix material 210 may be an amorphous glass that originated as a glass frit material. The particulate material 212 may be a different amorphous glass, such as a glass frit that has a higher melting and/or softening temperature than the matrix material 210. As another example, the particulate material 212 may be a crystalline material that has a higher melting and/or softening temperature than the matrix material 210. Example crystalline materials include crystalline ceramic materials, crystalline quartz, or the like. In either case, because the melting and/or softening temperature of the particulate material 212 is higher than that of the matrix material, at least some particles of the particulate material may remain physically distinct from the matrix material 210 (e.g., having well-defined material boundaries) and may protrude from the matrix material 210 to define the surface roughness of the glass member 200.

The density of the particulate material 212 within the matrix material 210 (as well as the size and shape of the particulate material 212) may be selected so as to produce a target surface roughness or other parameter. For example, larger particles may be selected to produce higher surface roughness, and rounder or more spherical particles may be selected to produce a higher gloss. Further, while FIG. 2B illustrates particulate material 212 having a generally uniform composition, shape, and size, the fused composite coating 208 may have multiple particulate materials, such as two or more particulate materials having different average particle sizes, shapes, compositions, or the like.

Figure 2C:
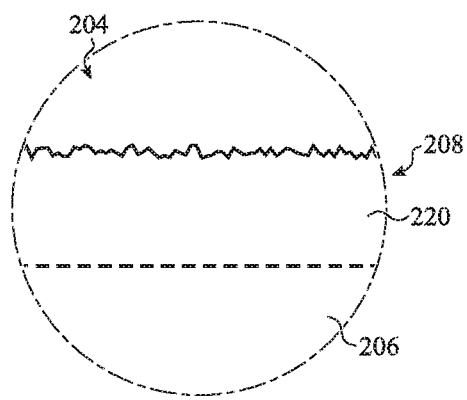
FIG. 2C depicts a detail view of a portion of the glass member of FIG. 2A according to another embodiment.

FIG. 2C illustrates a detail view of a portion of the glass member 200, corresponding to area B-B in FIG. 2A, illustrating another example composition of the fused composite coating 208. In this example, the fused composite coating 208 includes a matrix material 220 without distinct particulates. In this example, the surface irregularity of the matrix material itself may define the surface roughness. The surface irregularity of the matrix material 220 may be formed by applying a glass frit material to the substrate 206 and then heating the glass frit until it softens and flows sufficiently to form a continuous layer while also maintaining a particular surface roughness. In some cases, the roughness and/or irregularity of the surface may generally correspond to the shape of the glass frit particles along the top of the coating. That is, because the coating starts as a glass frit powder, the irregular surface defined by the powder may remain at least somewhat irregular even after the powder is allowed to fuse to form a solid, continuous coating.

As described above, glass members with textured surfaces may be chemically strengthened to improve strength, toughness, or other physical property of the glass members. Chemical strengthening may include exchanging first ions in a glass member for larger second ions at a temperature below the strain point of the glass, thereby producing one or more compressive stress layers or regions in a portion of the glass member. The first ions may be first alkali metal ions and the second ions may be larger second alkali metal ions. For example, in the case of a lithium aluminosilicate glass substrate, the substrate may have a base composition (prior to ion exchange) which includes lithium ions, and at least some of the lithium ions may be exchanged for sodium ions and/or potassium ions during the ion-exchange operations.

Figure 3A:
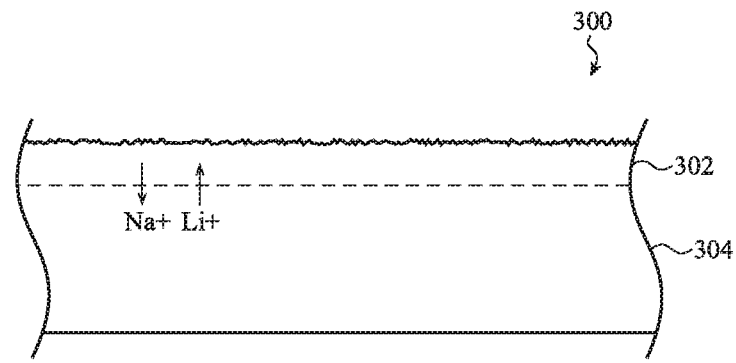
FIGS. 3A-3C depict a partial cross-sectional view of a glass member at various stages of ion exchange.
Figure 3B:
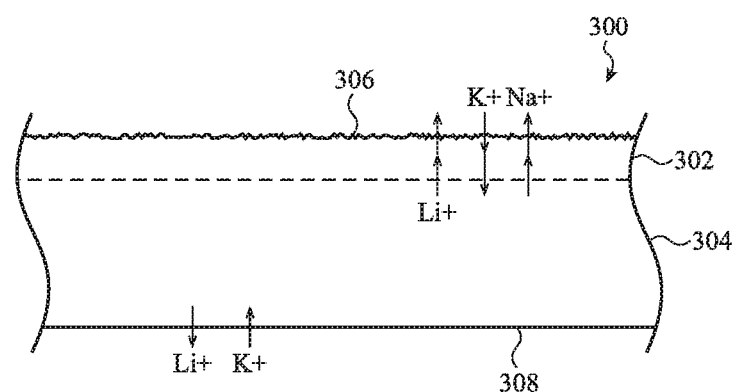
Figure 3C:
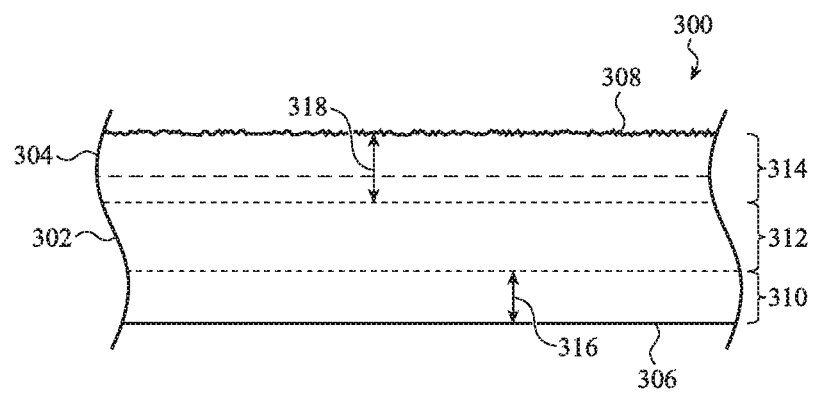

Because chemical strengthening operations change the internal stresses in a glass substrate, such operations may result in changes to the shape and/or configuration of a substrate. In the case of a planar sheet, the symmetry of the sheet may result in substantially symmetrical internal stresses, resulting in little or no distortion or warping of the sheet. However, when a fused composite coating is applied to one surface of the substrate, the coated and uncoated surfaces may react differently to the chemical strengthening process which may result in warpage or distortion of the substrate. Accordingly, the fused composite coating may be selected so that the effects of a chemical strengthening process are sufficiently balanced to avoid or limit such warpage or distortion. FIGS. 3A-3C illustrate examples of ion exchanges that may occur during the production of a textured glass member as described herein.

FIG. 3A illustrates a cross-sectional view of a glass member 300, which may be an embodiment of the glass member 200 or any other glass member described herein, after a composite coating 302 is fused together and bonded to a substrate 304. The fused composite coating 302 may include a matrix material that includes a glass frit having sodium ions, and the substrate 304 may include a glass having lithium ions (e.g., lithium aluminosilicate glass). FIG. 3A shows an example ion exchange that may have occurred during the process of fusing the composite coating 302 and bonding the composite coating 302 to the substrate 304. For example, when the composite coating is heated to perform the fusing and bonding operations, the heat may cause lithium ions from the substrate 304 to exchange for sodium ions in the fused composite coating 302.

FIG. 3B illustrates the glass member 300 after the glass member 300 of FIG. 3A is subjected to an ion-exchange bath or other ion-exchange process. For example, the glass member 300, which includes the substrate 304 and the fused composite coating 302, may be placed in an ion-exchange bath that includes a molten ionic salt (e.g., molten potassium salt, such as potassium nitrate). As a result of the ion-exchange bath or other chemical strengthening process, additional ion exchanges may occur in the glass member 300. For example, lithium ions in the substrate 304 may be exchanged, through a first surface 306 of the glass member 300, with potassium ions from the ion-exchange bath, as illustrated in FIG. 3B. Sodium ions may also be exchanged through the first surface 306 into the ion-exchange bath.

Additionally, as depicted in FIG. 3B, lithium ions may also be exchanged, through a second surface 308 of the glass member 300, with potassium ions from the ion-exchange bath. The lithium ions may migrate from the substrate 304 into the ion-exchange bath. Additionally, lithium ions may migrate from the fused composite coating 302 into the ion-exchange bath. The composite coating, prior to being fused, may not contain lithium ions. Accordingly, the lithium ions that migrate out of the fused composite coating 302 may have migrated into the composite coating 302 from the substrate 304 during fusion and bonding of the coating 302, as described with respect to FIG. 3A.

Sodium ions may migrate from the fused composite coating 302 into the ion-exchange bath. Additionally, sodium ions may migrate from the substrate 304 and into the ion-exchange bath. The sodium ions in the substrate 304 may have migrated into the substrate 304 from the fused composite coating 302 during fusion and boding of the coating 302, as described with respect to FIG. 3A. Potassium ions may penetrate through the fused composite coating 302 and into the material of the substrate 304, as shown in FIG. 3B. In other cases, the potassium ions may penetrate into the fused composite coating 302, but not reach the substrate 304.

FIG. 3C shows the glass member 300 after the glass member 300 is subjected to a chemical strengthening process (which may result in the ion exchanges described with respect to FIGS. 3A-3B). In particular, the glass member 300 (which includes the substrate 304 and the fused composite coating 302) may have a first ion-exchanged layer 310 extending into the glass member 300 through the first surface 306 and having a first thickness 316 (e.g., extending a first depth into the glass member 300). The glass member 300 may also have a second ion-exchanged layer 314 extending into the glass member 300 through the second surface 308 and having a second thickness 318 (e.g., extending a second depth into the glass member 300, optionally through the entire fused composite coating 302). The first and second thicknesses 316, 318 may be equal or they may be different. In some cases, the ion-exchanged layers 310, 314 may be different segments of a contiguous layer. For example, the ion-exchanged layers may be formed by submerging the glass member into an ion-exchange bath, as described herein, which may cause ions to be exchanged along all surfaces of the glass member. It will be understood that while the first and second ion-exchanged layers 310, 314 may be referred to as different layers, they may be different segments or areas of a single contiguous layer.

The first and second ion-exchanged layers 310, 314 may each have a compressive stress profile or gradient, and the glass member 300 may have a region 312 between the first and second ion-exchanged layers 310, 314 that has a tensile stress profile. The compressive stress profiles of the first and second ion-exchanged layers 310, 314 may be the same or they may be different from each other, but they may be balanced so that the glass member 300 does not significantly warp or bend as a result of the chemical strengthening profile. More particularly, in some cases the first ion-exchanged layer 310 may have a different thickness or depth of layer than the second ion-exchanged layer 314. In such case, the peak compressive stress in the thinner layer may be greater than the peak compressive stress in the thicker layer. In this way, the glass member 300 may remain substantially flat even after chemical strengthening and despite the fact that the fused composite coating 302 may respond to chemical strengthening differently than the substrate 304. Further, the first and second ion-exchanged layers 310, 314 may each have different compositions (e.g., they may have different types, amounts, concentrations, or combinations of ions). For example, the first ion-exchanged layer 310 may include lithium ions (from the substrate 304) and potassium ions (from the ion-exchange bath), while the second ion-exchanged layer 314 may include sodium ions (from the fused composite coating 302), lithium ions (from the substrate 304), and potassium ions (from the ion-exchange bath). The first ion-exchanged layer 310 may lack sodium ions, as the sodium ions in the second ion-exchanged layer 314 originated from the composite coating, which is not applied to the first surface 306. Thus, the first ion-exchanged layer 310 may have a composition that includes potassium and lithium (and may lack sodium), and the second ion-exchanged layer 314 may have a different composition that includes potassium, lithium, and sodium. In some cases, the first ion-exchanged layer may include sodium ions from other sources, but not from the composite coating. In such cases, the concentration of sodium ions in the first ion-exchanged layer 310 may be different than (e.g., less than) the concentration of sodium ions in the second ion-exchanged layer 314. In some cases, the ion concentrations of the potassium and lithium (and any other ions from chemical strengthening processes (or otherwise) that may be present in the textured glass member) may differ between the first and second ion-exchanged layers 310, 314.

One property of a material that may affect how it responds to chemical strengthening is the coefficient of thermal expansion (CTE) of the material. The CTE of an uncoated, uniform material may be substantially uniform along all of its surfaces. A glass member with a substrate that is coated only on one side or only in localized areas may have areas having different CTEs. The difference in CTEs may result in warping and/or distortion of the glass member as a result of the chemical strengthening process. Accordingly, the material(s) of the fused composite coating 302 may be selected so that the CTE of the fused composite coating 302 is the same as that of the substrate 304. In cases where the fused composite coating 302 comprises multiple different materials, the CTE may be an effective CTE of the fused composite coating 302. For example, the fused composite coating 302 may include materials having CTEs higher than the substrate 304 mixed with materials having lower CTEs than the substrate, thereby producing a coating that has a CTE that is similar to or the same as the substrate. As noted above, a fused composite coating 302 may include an amorphous matrix material and particles of crystalline material. In such cases, the crystalline materials may have a lower CTE than the amorphous matrix material, and as such the crystalline materials may offset the higher CTE of the matrix materials.

In some cases, it may be beneficial for the CTE of the fused composite coating 302 to be different than that of the substrate 304. For example, the types and concentrations of ions in a fused composite coating may cause the coated side of a glass member to react differently to a chemical strengthening bath, as compared to an uncoated side. Thus, in some cases configuring the fused composite coating to have a different CTE than the substrate itself may actually limit or minimize warping or bending of the glass member.

As shown in FIG. 3C, the second ion-exchanged layer 314 (and thus the compressive stress profile associated with the second ion-exchanged layer 314) is thicker than the thickness of the fused composite coating 302. This reflects the ion-exchange behavior illustrated in FIGS. 3A-3B, where sodium ions and/or potassium ions penetrate through the fused composite coating 302 and into the substrate 304. In other examples, however, the second ion-exchanged layer 314 (at least with respect to potassium ions) is less thick than the fused composite coating 302. The lines shown in FIG. 3C to illustrate the first and second ion-exchanged layers 310, 314 are merely illustrative, and it will be understood that the actual boundary of an ion-exchanged layer may not be as distinct as the lines shown in FIG. 3C. The boundaries of the ion-exchanged layers 310, 314, such as those shown in FIG. 3C, may correspond to a particular concentration of a particular ion (e.g., where a concentration of potassium ions is below a threshold value), or to a particular internal stress value (e.g., where the internal stress is zero or crosses from a compressive stress to a tensile stress).

Figure 4:
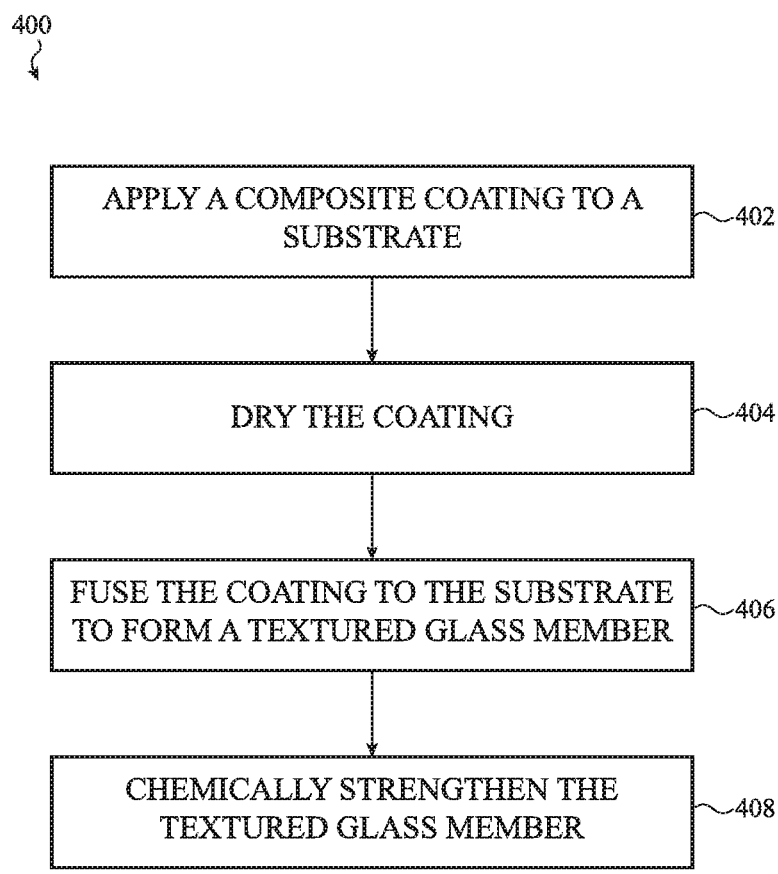
FIG. 4 depicts a flow chart of an example process for producing chemically strengthened and textured glass members.

FIG. 4 is a flow chart of an example process 400 for producing textured glass members. Textured glass members produced according to this process may be used as components of electronic devices, such as tablet computers, mobile phones, watches or other wearable electronic devices, notebook computers, or the like. Further, any of the textured glass members described herein may be produced according to this process.

At operation 402, a composite coating is applied to a surface of a substrate. The substrate may be any suitable substrate, as described herein. For example, the substrate may be an aluminosilicate glass substrate, a borosilicate glass substrate, a soda-lime glass substrate, or any other suitable glass substrate. The composite coating as applied may have any suitable depth. For example, the composite coating may have a thickness between about 1 micron and about 100 microns, or between about 1 microns and about 50 microns, or between about 2 microns and about 20 microns.

The composite coating may include various different components. For example, the composite coating may include powders or particulates that produce the tactile, textured surface of the glass member. Such particulates may include glass frit, powders of crystalline materials, ceramics, or the like. More particularly, as described herein, the composite coating may include one or more types of glass frit as well as one or more crystalline materials, and optionally additional solid (e.g., particulate) or liquid materials (e.g., non-glass materials, pigments, inks, filler materials, etc.).

The composite coating may also include materials that facilitate application of the composite coating and the formation of the fused composite coating, such as solvents, resins, emulsifiers, stabilizers, or the like. For example, the composite coating may include a solvent (e.g., a liquid solvent) that allows the composite coating to be applied to the glass substrate via pad printing, spraying, screen printing, or the like. The composite coating may also include a resin or other material that may harden or cure to stabilize the composite coating prior to the coating being fused together and bonded to the substrate. The composite coating may also include pigments, inks, colorants, or other materials that impart a particular color, opacity, or other visual property or characteristic to the composite coating. The composite coating may be or may resemble a liquid or a slurry.

The composite coating may be applied to the substrate using any suitable application process. For example, the composite coating may be applied using pad printing, screen printing, spraying, or any other application technique. The composite coating may be applied to any amount or portion of the substrate. For example, the composite coating may be applied to one side of the substrate (e.g., only one side). As another example, it may be applied to two sides of the substrate (e.g., a front and a back side). As yet another example, it may be applied to every surface of the substrate. In some cases, it may be applied to only localized regions of a surface of the substrate. For example, it may be applied in the shape of a logo, indicia, text, an image, a frame or border, or the like.

At operation 404, after the composite coating is applied to the substrate, the composite coating may be dried. Drying the coating may include heating the coating (and optionally the substrate) to evaporate, dry, or otherwise remove the solvent(s) in the composite coating. The drying may include heating the coating to a temperature below a softening temperature of the substrate and the glass frit and crystalline materials of the composite coating.

At operation 406, after the composite coating is dried, the composite coating and the substrate may be heated to fuse the composite coating (or at least portions of the composite coating), thereby forming a fused composite coating and bonding the fused composite coating to the substrate. Heating the substrate and the composite coating may include placing the coated substrate in a furnace or oven and heating the coated substrate at a target temperature for a duration. The target temperature and duration may depend at least in part on the composition of the composite coating, the composition of the substrate, the desired amount of flowing, melting, or softening of the composite coating, the thickness or other dimension of the substrate and/or the composite coating, or the like. In some cases, the temperature at which the coated substrate is heated is above a softening temperature of a glass frit material in the composite coating and below a softening temperature of the substrate (and optionally below a softening temperature and/or the melting temperature of an additional glass or crystalline material in the composite coating). In this way, the glass frit may flow and/or fuse together, and also bond to the substrate, without the substrate becoming hot enough to deform, flow, or melt.

In some cases, the heating profile may include heating the coated substrate at multiple different temperatures for different durations (e.g., heating at a first temperature for a first duration, and subsequently heating at a second temperature for a second duration). In some cases, the coated substrate itself reaches the target temperature (e.g., the coated substrate may be heated to the target temperature). Regardless of the particular heating profile or process used, the temperature(s) and duration(s) of heating may result in the composite coating becoming a solid, fused coating that is bonded to the underlying substrate, thus forming a textured glass member.

At operation 408, the textured glass member produced by fusing the composite coating to the substrate (at operation 406) is chemically strengthened. Chemically strengthening the textured glass member may include submerging the textured glass member in an ion-exchange bath. The particular ion-exchange bath, as well as the temperature of the bath and the duration that the textured glass member is submerged in the bath, may be selected based at least in part on the composition of the substrate and/or the composite coating, a target depth of ion penetration layer(s), a target strength of the textured glass member, a target flatness of the textured glass member, or the like.

The ion-exchange bath may result in the exchange of ions between the ion-exchange bath and the substrate and/or the fused composite coating, resulting in ion-exchanged layers in the textured glass member. Example ion-exchanged layers that may result from the operation 408 are described with respect to FIGS. 3A-3C.

The ion-exchange bath may comprise a molten ionic salt. For example, when potassium ions are to be introduced into the textured glass member, the ion-exchange bath may comprise potassium nitrate or another suitable potassium salt. The concentration of the potassium salt may be from 30 mol % to 100 mol %. In embodiments, the concentration of potassium salt is greater than 50 mol %. In further embodiments, the ion-exchange bath may further comprise additional alkali metal ions in a lesser amount, such as sodium ions. The time the cover spends in the ion-exchange bath may be from 15 minutes to 4 hours.

The ion-exchange bath temperature may be from the melting point of the salt to approximately 600° C., or any other suitable temperature that is high enough to facilitate ion exchange without causing the textured glass member to melt or flow to a degree that it loses its general shape. In some cases, the temperature of the ion-exchange bath may be below a strain point or a glass transition point of the substrate, so that exchanging alkali metal ions in the glass and/or the fused composite coating with larger alkali metal ions tends to cause an expansion of an ion-exchanged zone of the textured glass member. However, expansion of the ion-exchanged layer of the textured glass member may be constrained by a remainder of the textured glass member which is not ion-exchanged. As a result, a compressive stress region, such as a biaxial residual compressive stress region, may be created in the ion-exchanged layer.

In some cases, the operation 408 of chemically strengthening the textured glass member may include more than one ion-exchange bath. For example, the textured glass member may be subjected to two or more ion-exchange baths (or other ion exchange processes). The ion-exchange baths may have different compositions (e.g., different exchangeable ions) and/or different temperatures, and the textured glass member may be subjected to the different baths for different durations.

In some cases, additional or fewer operations may be used to form the textured glass members described herein. For example, additional operations not described with respect to the process 400 may be employed (including but not limited to additional heating operations, curing operations, coating operations, polishing or other machining operations, or the like). Further, operations of the process 400 may be reordered and/or omitted. Other modifications or adjustments are also contemplated.

After the textured glass member is chemically strengthened, it may be coupled to a housing member of an electronic device. In some cases the textured glass member is coupled to the housing member such that the fused composite coating defines an exterior surface of the electronic device. For example, where the electronic device is a mobile phone, as described with respect to FIGS. 1A-1C, the textured glass member may define a back of the mobile phone, and the fused composite coating may define an exterior back surface of the device.

Figure 5A:
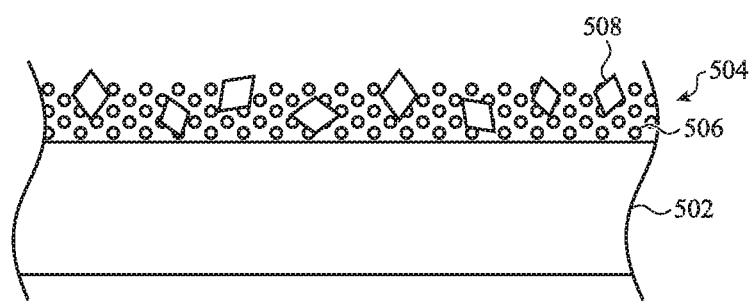
FIG. 5A depicts a partial cross-sectional view of a glass member with a composite coating applied to a surface.
Figure 5B:
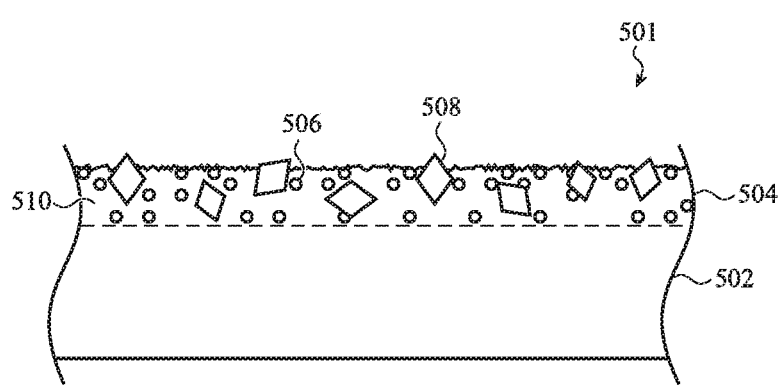
FIG. 5B depicts a partial cross-sectional view of the glass member of FIG. 5A with fused a composite coating.

FIG. 5A illustrate cross-sectional views of a substrate 502 and a composite coating 504 after the composite coating 504 is applied to the substrate 502 and before the composite coating 504 is fused. FIG. 5B, described below, illustrates the substrate 502 after the composite coating 504 has been fused.

As noted above, a composite coating may include multiple different particulates. As shown in FIG. 5A, the composite coating 504 may include a glass frit 506 and particles of a crystalline material 508 (also referred to herein simply as "crystalline particles"). The glass frit 506 may have an average particle size. For example, the average particle size of the glass frit 506 may be between about 0.10 and 0.50 microns, between about 0.50 and 1.0 microns, between about 1.0 and 5.0 microns, or any other suitable size. The glass frit 506 may be formed from any suitable type of glass. The glass frit 506 may be a single composition of glass (e.g., all particles are of the same glass), or a combination of different glasses (e.g., the glass frit 506 is a combination of two or more different glasses). In cases where the glass frit 506 includes multiple types of glasses, the different glasses may have different average particle sizes.

The crystalline particles 508 may have an average particle size that may be the same as or different from the average particle size of the glass frit 506. For example, the crystalline particles 508 may have an average particle size between about 0.10 and 0.50 microns, between about 0.50 and 1.0 microns, between about 1.0 and 5.0 microns, or any other suitable size. The crystalline particles 508 may be substantially homogenously or evenly distributed in the glass frit 506 to form a textured surface having a uniform appearance and/or tactile feel.

The composite coating may include other materials as well. For example, as described herein, the composite coating 504 may include pigments, inks, filler materials, non-glass particulates, or the like. Such additives or materials may be configured to produce a desired visual, optical, or physical property of the final resulting coated glass member, or to improve or change how the composite coating behaves during processing.

FIG. 5B shows the composite coating 504 after the glass frit 506 has fused to form a solid matrix 510 and to bond to the substrate 503. As shown, the crystalline particles 508 may be substantially unchanged as a result of the fusing operation, and at least some of the crystalline particles 508 may protrude from the matrix 510 and define a textured, tactile surface of the textured glass member. In some cases, some of the crystalline particles may become amorphous as a result of heating that accompanies fusing the glass frit and/or chemically strengthening the textured glass member. For example, some of the crystalline particles 508 may become entirely amorphous, and may flow or soften so that they no longer maintain their shape (and do not protrude from the matrix 510 and/or become part of the matrix 510). As another example, some portion of individual crystalline particles 508 may become amorphous, which may change the size and/or shape of those particles but otherwise does not cause the crystalline particles 508 to lose their overall physical distinctiveness from the matrix 510 and their ability to define the surface roughness of the coating.

FIG. 5B shows that some of the particles of the glass frit 506 remain un-melted and/or retain a distinct physical shape and/or presence in the matrix 510 after the glass frit is otherwise fused. In other cases, none of the glass frit remains in this state, and all of the glass frit has been melted and/or flowed into a single amorphous mass.

As shown in FIG. 5B, the textured glass member 501 does not have significant cracks formed along the exterior surfaces. More particularly, the surface texture and resulting tactile feel of the surface of the textured glass member 501 is defined by the matrix 510 and the crystalline particles 508 (or, in the case of a coating without crystalline particles, a solid textured glass layer formed from a glass frit), rather than via cracks or fractures that may be produced as a result of chemical or physical etching. Accordingly, the textured glass member 501 may have a high strength and/or toughness and may provide a stable physical configuration for chemical strengthening.

Various properties of the composite coating may define or impact physical properties or characteristics of the textured glass member and the surface roughness of the fused composite coating. For example, the particular particle sizes of the glass frit 506 and the crystalline particles 508, as well as the differences in size between the glass frit 506 and the crystalline particles 508, may. More particularly, glass frit 506 and/or crystalline particles 508 having larger sizes may produce rougher surface textures. Also, the differences in CTE between two materials (e.g., glass frit and crystalline particles) may affect the roughness, with greater differences in CTEs resulting in greater surface roughness (e.g., rougher textures).

Properties of the composite coating 504 may also define or impact optical properties of the textured glass member. For example, crystalline materials may be less transparent than glass materials. Accordingly, greater amounts of crystalline particles relative to glass frit may result in a less transparent (e.g., more translucent or opaque) textured glass member. Also, the extent to which components of the composite coating 504 are allowed to melt or flow during fusing may affect the transparency of the resulting fused composite coating. For example, longer heating times and/or higher heating temperatures (which may increase the amount of melting, relaxing, and/or flowing of components of the composite coating) may result in higher transparency relative to lower times or temperatures.

Figure 6:
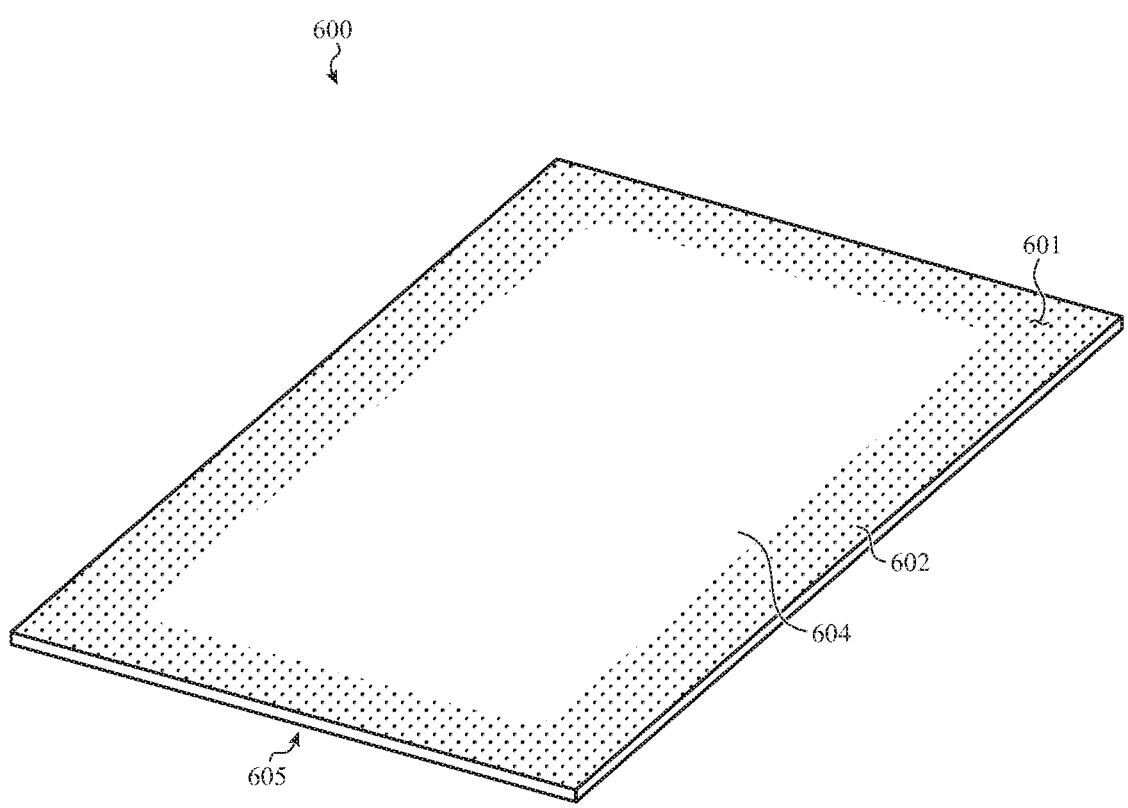
FIG. 6 depicts a perspective view of a locally textured glass member.

As noted above, composite coatings may be applied to all or less than all of the surfaces of a glass substrate. For example, as shown and described above, a glass substrate may be coated along only those surfaces that define an exterior surface of an electronic device or electronic device housing. FIG. 6 illustrates an example textured glass member 600 that has a fused composite coating over only a localized portion of the glass member 600. For example, the textured glass member 600 defines a first surface 601 (which may correspond to a front or back exterior surface of an electronic device) and a second surface 605 opposite the first surface (which corresponds to the other of the front or back exterior surface of the electronic device). The first surface 601 includes a fused composite coating 602 over only a portion of the first surface 601. As shown, the fused composite coating 602 defines a peripheral frame surrounding an un-coated central region 604. The fused composite coating 602 may have a surface roughness as described herein. The second surface 605 of the glass member 600 may be entirely uncoated, or it may have a localized composite coating having a similar or identical positioning and/or layout as the fused composite coating 602 (e.g., defining a peripheral frame surrounding an uncoated central region). In other cases, the second surface 605 may have a localized fused composite coating having a different positioning and/or layout as the first surface 601.

Figure 7:
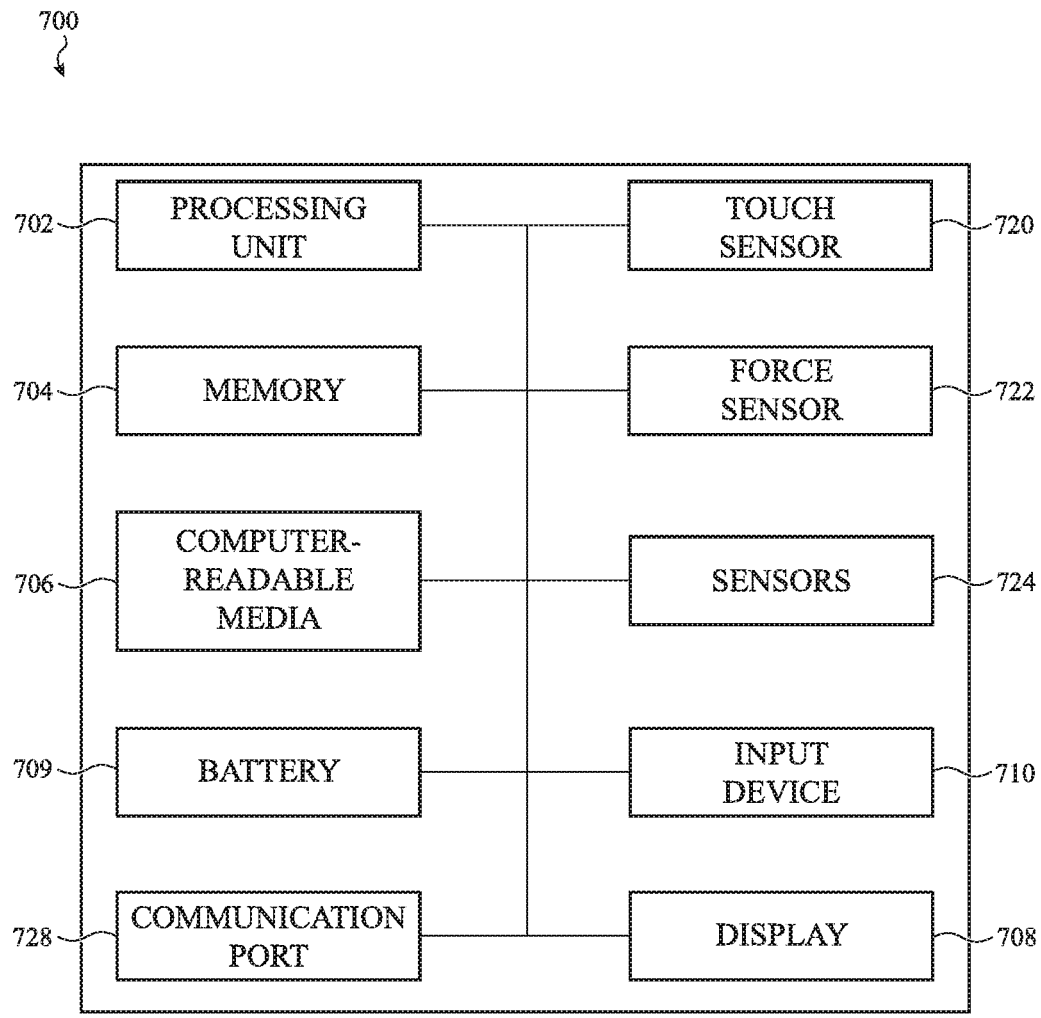
FIG. 7 depicts example components of an electronic device.

FIG. 7 depicts an example schematic diagram of an electronic device 700. By way of example, the device 700 of FIG. 7 may correspond to the electronic device 100 shown in FIGS. 1A-1C (or any other electronic device described herein). To the extent that multiple functionalities, operations, and structures are disclosed as being part of, incorporated into, or performed by the device 700, it should be understood that various embodiments may omit any or all such described functionalities, operations, and structures. Thus, different embodiments of the device 700 may have some, none, or all of the various capabilities, apparatuses, physical features, modes, and operating parameters discussed herein.

As shown in FIG. 7, a device 700 includes a processing unit 702 operatively connected to computer memory 704 and/or computer-readable media 706. The processing unit 702 may be operatively connected to the memory 704 and computer-readable media 706 components via an electronic bus or bridge. The processing unit 702 may include one or more computer processors or microcontrollers that are configured to perform operations in response to computer-readable instructions. The processing unit 702 may include the central processing unit (CPU) of the device. Additionally or alternatively, the processing unit 702 may include other processors within the device including application specific integrated chips (ASIC) and other microcontroller devices.

The memory 704 may include a variety of types of non-transitory computer-readable storage media, including, for example, read access memory (RAM), read-only memory (ROM), erasable programmable memory (e.g., EPROM and EEPROM), or flash memory. The memory 704 is configured to store computer-readable instructions, sensor values, and other persistent software elements. Computer-readable media 706 also includes a variety of types of non-transitory computer-readable storage media including, for example, a hard-drive storage device, a solid-state storage device, a portable magnetic storage device, or other similar device. The computer-readable media 706 may also be configured to store computer-readable instructions, sensor values, and other persistent software elements.

In this example, the processing unit 702 is operable to read computer-readable instructions stored on the memory 704 and/or computer-readable media 706. The computer-readable instructions may be provided as a computer-program product, software application, or the like.

As shown in FIG. 7, the device 700 also includes a display 708. The display 708 may include a liquid-crystal display (LCD), organic light emitting diode (OLED) display, light emitting diode (LED) display, or the like. If the display 708 is an LCD, the display 708 may also include a backlight component that can be controlled to provide variable levels of display brightness. If the display 708 is an OLED or LED type display, the brightness of the display 708 may be controlled by modifying the electrical signals that are provided to display elements. The display 708 may correspond to any of the displays shown or described herein, such as the display 116 (FIG. 1C) that is viewable through the first glass member 106.

The device 700 may also include a battery 709 that is configured to provide electrical power to the components of the device 700. The battery 709 may include one or more power storage cells that are linked together to provide an internal supply of electrical power. The battery 709 may be operatively coupled to power management circuitry that is configured to provide appropriate voltage and power levels for individual components or groups of components within the device 700. The battery 709, via power management circuitry, may be configured to receive power from an external source, such as an AC power outlet. The battery 709 may store received power so that the device 700 may operate without connection to an external power source for an extended period of time, which may range from several hours to several days.

In some embodiments, the device 700 includes one or more input devices 710. An input device 710 is a device that is configured to receive user input. The one or more input devices 710 may include, for example, a rotatable input system, a push button, a touch-activated button, a keyboard, a key pad, or the like (including any combination of these or other components). In some embodiments, the input device 710 may provide a dedicated or primary function, including, for example, a power button, volume buttons, home buttons, scroll wheels, and camera buttons.

The device 700 may also include a sensor 724. The sensor 724 may detect inputs provided by a user to one or more of the input devices 710 of the device 700. The sensor 724 may also be a biometric sensor, such as a heart rate sensor, electrocardiograph sensor, temperature sensor, or any other type of sensor. In cases where the sensor 724 is a biometric sensor, it may include biometric sensing circuitry, as well as portions of a crown that conductively couple a user's body to the biometric sensing circuitry. Biometric sensing circuitry may include components such as processors, capacitors, inductors, transistors, analog-to-digital converters, or the like.

The device 700 may also include a touch sensor 720 that is configured to determine a location of a touch on a touch-sensitive surface of the device 700 (e.g., an input surface defined by the first or second glass members 106, 108). The touch sensor 720 may use or include capacitive sensors, resistive sensors, surface acoustic wave sensors, piezoelectric sensors, strain gauges, or the like. In some cases the touch sensor 720 associated with a touch-sensitive surface of the device 700 may include a capacitive array of electrodes or nodes that operate in accordance with a mutual-capacitance or self-capacitance scheme. The touch sensor 720 may be integrated with one or more layers of a display stack (e.g., the display 116, FIG. 1C) to provide the touch-sensing functionality of a touchscreen.

The device 700 may also include a force sensor 722 that is configured to receive and/or detect force inputs applied to a user input surface of the device 700 (e.g., a surface of the first and/or second glass members 106, 108). The force sensor 722 may use or include capacitive sensors, resistive sensors, surface acoustic wave sensors, piezoelectric sensors, strain gauges, or the like. In some cases, the force sensor 722 may include or be coupled to capacitive sensing elements that facilitate the detection of changes in relative positions of the components of the force sensor (e.g., deflections caused by a force input). The force sensor 722 may be integrated with one or more layers of a display stack (e.g., the display 116) to provide force-sensing functionality of a touchscreen.

The device 700 may also include a communication port 728 that is configured to transmit and/or receive signals or electrical communication from an external or separate device. The communication port 728 may be configured to couple to an external device via a cable, adaptor, or other type of electrical connector. In some embodiments, the communication port 728 may be used to couple the device 700 to an accessory, including a dock or case, a stylus or other input device, smart cover, smart stand, keyboard, or other device configured to send and/or receive electrical signals.

While the device 700 is described as having a particular set of components, the device 700 is not limited to only those components described herein. For example, a device may include more than one of the components described with respect to FIG. 7 or elsewhere in the instant application, and may indeed include other components not described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A glass member for a housing of an electronic device, comprising:
   an aluminosilicate glass substrate defining a first surface of the glass member, the first surface having a first average surface roughness (Ra) below 1 micron;
   a fused composite coating bonded to a portion of the aluminosilicate glass substrate and comprising:
     an amorphous glass matrix having a softening temperature that is lower than a softening temperature of the aluminosilicate glass substrate and a coefficient of thermal expansion that is greater than the coefficient of thermal expansion of the aluminosilicate glass substrate; and
     crystalline particles having a softening temperature that is higher than the softening temperature of the amorphous glass matrix and a coefficient of thermal expansion that is less than the coefficient of thermal expansion of the amorphous glass matrix, the crystalline particles dispersed in the amorphous glass matrix and extending from a surface of the amorphous glass matrix, thereby defining a textured second surface of the glass member, the textured second surface having a second average surface roughness (Ra) between 1 micron and 10 microns;
   a first ion-exchanged layer extending into the glass member and through the fused composite coating; and
   a second ion-exchanged layer extending into the glass member from the first surface.

2. The glass member of claim 1, wherein the second ion-exchanged layer extends into the aluminosilicate glass substrate.

3. The glass member of claim 1, wherein the first ion-exchanged layer comprises:
   sodium ions, from the fused composite coating, in the aluminosilicate glass substrate; and
   lithium ions, from the aluminosilicate glass substrate, in the fused composite coating.

4. The glass member of claim 1, wherein:
   the first ion-exchanged layer has a first composition and comprises sodium ions, lithium ions, and potassium ions; and
   the second ion-exchanged layer has a second composition different from the first composition and comprises lithium ions and potassium ions.

5. The glass member of claim 1, wherein:
   the first ion-exchanged layer extends a first depth into the glass member; and
   the second ion-exchanged layer extends a second depth into the glass member, the second depth different than the first depth.

6. The glass member of claim 1, wherein the crystalline particles have an average particle size of between about 0.1 microns and about 0.5 microns.

7. The glass member of claim 1, wherein the crystalline particles are ceramic particles.

8. The glass member of claim 1, wherein:
   the glass member defines a back of the electronic device;
   the first surface defines a first region of the back of the electronic device; and
   the second surface defines a second region of the back of the electronic device.

9. The glass member of claim 1, wherein a coefficient of thermal expansion of the fused composite coating is about the same as the coefficient of thermal expansion of the aluminosilicate glass substrate.

10. An electronic device comprising:
    a processor;
    a display; and
    a housing comprising a chemically strengthened glass member, the chemically strengthened glass member comprising:
      an aluminosilicate glass substrate defining a first surface of the chemically strengthened glass member, the first surface having a first average surface roughness (Ra) below 1 micron; and a fused composite coating bonded to the aluminosilicate glass substrate and comprising:
an amorphous glass matrix having a softening temperature that is lower than a softening temperature of the aluminosilicate glass substrate and a coefficient of thermal expansion that is greater than a coefficient of thermal expansion of the aluminosilicate glass substrate; and
particles of a crystalline material having a softening temperature that is higher than the softening temperature of the amorphous glass matrix and a coefficient of thermal expansion that is less than the coefficient of thermal expansion of the amorphous glass matrix, the particles of the crystalline material dispersed in the amorphous glass matrix and protruding from a surface of the amorphous glass matrix, thereby defining a textured second surface of the chemically strengthened glass member, the textured second surface having a second average surface roughness (Ra) between 1 micron and 10 microns;
a first ion-exchanged layer extending into the glass member and through the fused composite coating; and
a second ion-exchanged layer extending into the glass member from the first surface.

11. The electronic device of claim 10, wherein:
the housing further defines a glass member defining a front of the electronic device and positioned over the display; and
the chemically strengthened glass member defines a back of the electronic device.

12. The electronic device of claim 11, wherein the second surface of the chemically strengthened glass member defines an exterior back surface of the electronic device.

13. The electronic device of claim 10, wherein:
the first ion-exchanged layer has a first compressive stress profile;
the second ion-exchanged layer has a second compressive stress profile different than the first compressive stress profile; and
the chemically strengthened glass member further comprises a region between the first and second ion-exchanged layers having a tensile stress profile.

14. The electronic device of claim 10, wherein:
the fused composite coating has a coefficient of thermal expansion that is about the same as the coefficient of thermal expansion of the aluminosilicate glass substrate.

15. The electronic device of claim 10, wherein the fused composite coating has a thickness between about 5 microns and about 20 microns.

16. A method comprising:
providing an aluminosilicate glass substrate defining a first surface, the first surface having a first average surface roughness (Ra) below 1 micron;
applying to a second surface of the aluminosilicate glass substrate a composite coating comprising:
a glass frit having a softening temperature that is lower than a softening temperature of the aluminosilicate glass substrate and a coefficient of thermal expansion that is greater than a coefficient of thermal expansion of the aluminosilicate glass substrate;
a crystalline material having a softening temperature that is higher than the softening temperature of an amorphous glass matrix formed by fusing the glass frit and having a coefficient of thermal expansion that is less than the coefficient of thermal expansion of the amorphous glass matrix;
a solvent; and
a resin;
drying the composite coating to remove the solvent;
heating the aluminosilicate glass substrate and the composite coating to fuse the glass frit, thereby producing a fused composite coating including the amorphous glass matrix, and to bond the fused composite coating to the aluminosilicate glass substrate and define a textured surface having an average surface roughness (Ra) between 1 micron and 10 microns and defined at least in part by the crystalline material protruding from a surface of the amorphous glass matrix, thereby forming a textured glass member; and
chemically strengthening the textured glass member thereby producing:
a first ion-exchanged layer extending into the textured glass member and through the fused composite coating; and
a second ion-exchanged layer extending into the textured glass member from the first surface.

17. The method of claim 16, wherein the operation of heating the aluminosilicate glass substrate and the composite coating causes sodium ions to migrate from the composite coating into the aluminosilicate glass substrate.

18. The method of claim 16, wherein the operation of heating the aluminosilicate glass substrate and the composite coating comprises heating the aluminosilicate glass substrate and the composite coating to a temperature above the softening temperature of the glass frit, below the softening temperature of the aluminosilicate glass substrate, and below the softening temperature of the crystalline material.

19. The method of claim 16, wherein the operation of chemically strengthening the textured glass member comprises submerging the textured glass member in a bath comprising potassium salt.

20. The method of claim 16, wherein the operation of applying the composite coating comprises screen printing the composite coating on one side of the aluminosilicate glass substrate.

* * * * *